(12) United States Patent
de Jong et al.

(10) Patent No.: US 11,755,262 B2
(45) Date of Patent: Sep. 12, 2023

(54) DIGITAL PROCESS CONTROLLER AND A METHOD FOR CONTROLLING A PRODUCTION PROCESS OF A COMPLEX COMPOSED END PRODUCT

(71) Applicant: CANON KABUSHIKI KAISHA, Tokyo (JP)

(72) Inventors: Frederik de Jong, Roermond (NL); Vasile Bandea, Timișoara (RO); Bogdan Brudiu, Timișoara (RO)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/396,485

(22) Filed: Aug. 6, 2021

(65) Prior Publication Data

US 2022/0050642 A1 Feb. 17, 2022

(30) Foreign Application Priority Data

Aug. 13, 2020 (EP) .................................... 20190878

(51) Int. Cl.
*G06F 3/12* (2006.01)

(52) U.S. Cl.
CPC .......... *G06F 3/1207* (2013.01); *G06F 3/1256* (2013.01); *G06F 3/1259* (2013.01); *G06F 3/1204* (2013.01)

(58) Field of Classification Search
CPC .... G06F 3/1207; G06F 3/1256; G06F 3/1259; G06F 3/1205; G06F 3/1208; G06F 3/1285; G06F 3/1282; G06F 3/1275; G06F 3/1204
USPC ........................................................ 358/1.14
See application file for complete search history.

(56) References Cited

U.S. PATENT DOCUMENTS

| | | | | |
|---|---|---|---|---|
| 6,809,831 B1* | 10/2004 | Minari | .................. | G06F 3/1285 358/1.14 |
| 2008/0266578 A1* | 10/2008 | Matoba | .............. | H04N 1/00002 358/1.1 |
| 2013/0194332 A1* | 8/2013 | Meyer | ........................ | B41J 3/60 347/20 |
| 2016/0107392 A1* | 4/2016 | Lubin | .................. | B29C 64/386 700/98 |

FOREIGN PATENT DOCUMENTS

EP 3591512 A1 1/2020

* cited by examiner

*Primary Examiner* — Darryl V Dottin
(74) *Attorney, Agent, or Firm* — Canon U.S.A., Inc. IP Division

(57) ABSTRACT

Digital process controller and a method for controlling a production process of a complex composed end product by process jobs. Each process job is a pre-print job, a print job or a finishing job. The digital process controller is connected to a digital network, provided with a user interface and configured to receive print content and print and finishing specifications of the complex composed end product via the digital network, to receive a selection of a process recipe for the complex composed end product, the process recipe comprising a plurality of process steps and the relationships between the process steps, to decompose the production of the complex composed end product into the plurality of process steps in the process recipe, to execute the process recipe process step by process step, to validate each process step individually, and to display the validation result of each process step at the user interface.

12 Claims, 5 Drawing Sheets

DIGITAL PROCESS CONTROLLER AND A METHOD FOR CONTROLLING A PRODUCTION PROCESS OF A COMPLEX COMPOSED END PRODUCT

CROSS REFERENCE TO RELATED APPLICATION

This application claims the benefit under 35 U.S.C. § 119(a)-(d) of European Patent Application No. 20190878.7, filed on Aug. 13, 2020. The above cited patent application is incorporated herein by reference in its entirety.

FIELD OF THE DISCLOSURE

The present disclosure relates to a digital process controller and a method for controlling a production process of a complex composed end product by process jobs, each process job being a pre-print job, a print job or a finishing job, the digital process controller being connected to a digital network and provided with a user interface.

BACKGROUND OF THE DISCLOSURE

Today, typically the focus in production of a complex composed end product is on the individual print devices and associated print jobs for those devices.

However, production in graphic arts environments more and more involves complex composed end products (like e.g. books) that are realized through multiple process steps on different printing and finishing devices. Such a production process of a complex composed end product involves the aspects of determining the product parts needed and the process steps required to produce the product parts, passing instructions to operators, locating the independent product parts and tracking the status of the independent product parts. Ensuring that all production steps executed in sequence results in the right product with the required quality, is a challenging and error prone process. Error in this case is not only an artefact that will cause a device to fault, but also causes a creation of a different product than expected or desired. Supporting this in a way that supports less trial & error runs—which cost money and intervene with actual production, has much value. This is especially true for environments where many new graphic arts products are developed by the customers. Good 'dry-run' functionality with the right support can be of essential value here.

SUMMARY OF THE DISCLOSURE

It is an object of the present disclosure to provide a digital process controller and a method therefor in order to improve the production process of a complex composed end product.

The digital process controller according to the present disclosure, in order to achieve this object, is configured to receive a selection of a process recipe for the complex composed end product, the process recipe comprising a plurality of process steps and the relationships between the process steps, and to validate each process step individually, and to display the validation result of each process step at the user interface.

The validation checks that the process recipe satisfies or fits the intended use, i.e., the process recipe meets the user requirements, not as specification artifacts or as needs of those who will operate the process recipe only; but, as the needs of all the stakeholders (such as users, customers, operators, administrators, managers, investors, etc.). There are two ways to perform the process recipe validation: internal and external. During internal process recipe validation, it is assumed that the goals of the stakeholders were correctly understood and that they were expressed in the requirement artifacts precisely and comprehensively. If the process recipe meets the requirement specification, it has been internally validated. External process recipe validation happens when it is performed by asking the stakeholders if the process recipe meets their needs. Different software development methodologies call for different levels of user and stakeholder involvement and feedback; so, external validation can be a discrete or a continuous event. Successful final external validation occurs when all the stakeholders accept the process recipe and express that it satisfies their needs. Such final external validation requires the use of an acceptance test which is a dynamic test.

The relation between the different process steps is saved as a process recipe, and this relational knowledge is used and available at all relevant moments and places in the validation of the process steps of the process recipe.

The relation between the different process steps in the production process is saved as a process recipe, including operator instructions, and this knowledge is used and available at all relevant places in a user interface of the digital process controller.

The user selects the process recipe he wants. A collection of process recipes can be created by the user by means of a process recipe creation software application which may reside on the digital process controller. In another embodiment the process recipe creation software application is residing on another computer connected to the network and submits recipes to the digital process controller for storing in a dedicated recipe storage on the digital process controller. The process recipe determines which process steps should be executed, in which order, and how, i.e. which software applications are used in the pre-printing process steps, which devices have to be used in the printing and finishing process steps, and which device/operator instructions have to be provided. The process recipe also establishes the dependencies between the process steps, and the digital process controller executes the process recipe by executing the process steps in the process recipe in the right order for validation.

A process step produces a product part which is the end result of the process step. The product part may be in a digital form in case of a pre-printing step, or may be in a physical form in case of a printing or finishing step. One or more devices may be involved at the execution of the process step. Also one or more process jobs may be involved in a process step.

According to an embodiment the digital process controller is configured to receive print content and print and finishing specifications of the complex composed end product via the digital network, to decompose the production of the complex composed end product into the plurality of process steps in the process recipe, and to execute the process recipe process step by process step.

The process recipe is executed step by step, and each step is validated individually.

Output of each step is shown in a preview, allowing the user to check whether the outcome matches the expectations. Additionally errors are indicated. By combining the preview with the errors, the user can check, from start to finish, if the process recipe is valid and will result in the right product.

The process recipe may be represented by a directed graph made up of a set of vertices connected with edges, each edge having an associated direction, wherein the vertices represent the process steps and the direction of an edge between two vertices represent a sequence order of execution of the corresponding process steps.

The directed graph may be a weighted directed graph, wherein the weight on a vertex of the weighted directed graph represents an estimated execution time of the process step represented by the vertex, the estimated execution time being determined by the digital process controller.

The process recipe may comprise parallel branches, each branch representing a process step of the complex composed end product or an alternative process step of the complex composed end product based on conditional branching.

The digital process controller may comprise a track and trace mechanism for tracking and tracing the status and progress information of a validation of each process step.

According to an embodiment the validation result is a preview of an outcome of the corresponding process step and an indication of an occurred error, if any.

According to an embodiment input for the execution of the process recipe is the print content. According to an alternative embodiment input for the execution of the process recipe is a sample file which is considered to be representative for the complex composed end product.

Using sample files or a real job, the process recipe is processed from start to finish. The user can go through the process recipe step by step. At each step the process step in the process recipe may indicate an error, for example marks outside a page, page trim boxes which are too big in size for the selected impositioning scheme, etc.). The process step that has an issue is indicated. After solving said problem, a next problem may be indicated.

According to an embodiment a page size of the sample file matches with the page size specified in the print and finishing specifications of the complex composed end product.

A design of a process recipe is checked with a so-called simulation file that is considered to be representative of the expected input (like input page sizes matching the page sizes of a final book).

According to an embodiment the user interface is configured to display a real-time view on the process recipe when executed by indicating which process step of the process recipe is currently validated and by displaying the outcome of the process step and the indication of an occurred error, if any.

According to an embodiment the validation comprises a check if an output format, an output data type and/or an output range of a process step in the process recipe matches with an input format, an input data type and/or an input range respectively of a next process step in the process recipe and in case of a mismatch the user interface is configured to display the process step in a deviating shape or colour. During recipe design, it is checked that output of a process step, for example a file having a well known file format like "ps", "afp", or "pdf", or a roll of paper, stack of sheets, etc., matches with a input required for the next process step. In case of a mismatch a box in the process recipe which represents the process steps in a window on a display of the user interface which has a problem may be deviating qua shape or colour or may be highlighted or flickering.

The present disclosure also relates to a user interface for a digital process controller according to the present disclosure, wherein the user interface is configured to display a digital representation of the process steps of the process recipe and a real-time view on the process recipe when executed by indicating which process step of the process recipe is validated and by displaying the outcome of the process step and the indication of an occurred error, if any.

The present disclosure also relates to a production system for producing complex composed end products by means of printing devices and finishing devices, wherein the production system comprises a digital process controller according to the disclosure and a user interface according to the disclosure.

The present disclosure also relates to a method for controlling a production process of a complex composed end product by means of a digital process controller connected to a digital network, the method comprising the steps of receiving print content and print and finishing specifications of the complex composed end product via the digital network, receiving a selection of a process recipe for the complex composed end product, the process recipe comprising a plurality of process steps and the relationships between the process steps, decomposing the production of the complex composed end product into the plurality of process steps in the process recipe, executing the process recipe process step by process step, validating each process step individually, and displaying the validation result per process step at the user interface.

The present disclosure also relates to a recording medium comprising computer executable program code configured to instruct a computer to perform the method according to the present disclosure.

BRIEF DESCRIPTION OF THE DRAWINGS

Embodiment examples will now be described in conjunction with the drawings, wherein.

DETAILED DESCRIPTION OF EMBODIMENTS

Figure 1:
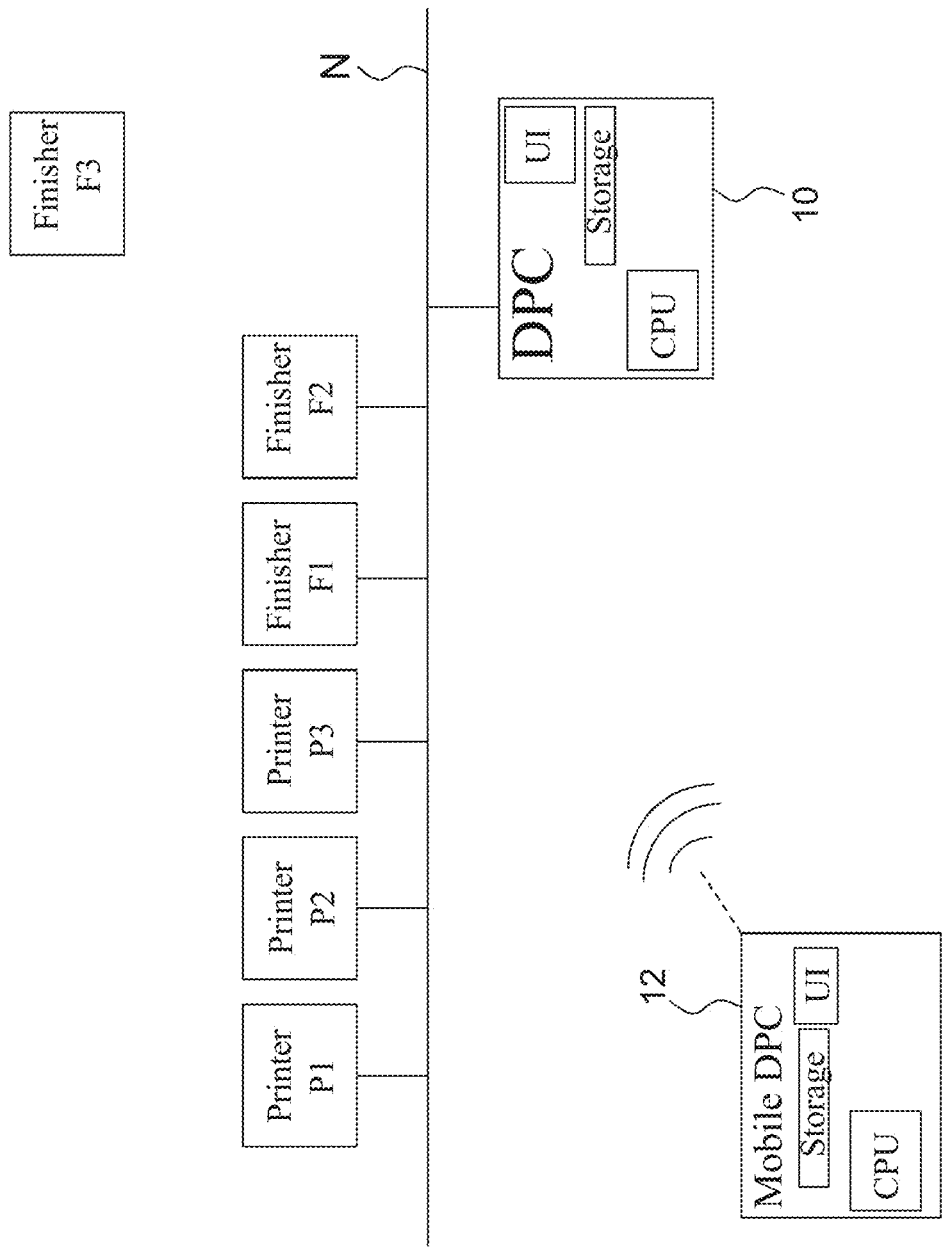
FIG. 1 is a network diagram comprising a digital process controller according to the present disclosure.

FIG. 1 shows a digital process controller (DPC) 10 for controlling a production process of the complex composed end product by process jobs according to the present disclosure. The digital process controller is connected to a digital network N. According to an embodiment the digital process controller DPC 10 is wire-connected to the digital network N. According to another embodiment the digital process controller DPC 12 is a mobile device which is wireless connected to the digital network N. For convenience reasons, both embodiments are shown in FIG. 1. The digital process controller 10, 12 is configured to receive content and print and finishing specifications of the complex composed end product via the digital network N.

The digital process controller 10, 12 comprises a central processor unit CPU, a storage medium, and a user interface UI for displaying a process recipe and a validation of the process recipe.

Each product part of the complex composed end product is intended to be processed by at least one processing device. The processing device may also be a computer having a software application installed for execution of a pre-printing process step like pre-flighting, etc. The processing device may be a printer P1, P2, P3 or a finisher F1, F2 connected to the digital network N. The processing device may also be an off-line finisher, for example a finisher named "Finisher F3" shown in FIG. 1. The product parts are produced in the process steps according to the process recipe which is designed by a process recipe designer application. The process designer application may be installed on the digital process controller 10, 12 or elsewhere installed on a work station connected to the digital network N. For each process step at least one process job is derived from the process recipe. The at least one process job is intended to be scheduled in a multi-device time scheduler (not shown) for execution by the corresponding processing device P1, P2, P3, F1, F2, F3.

Figure 2:
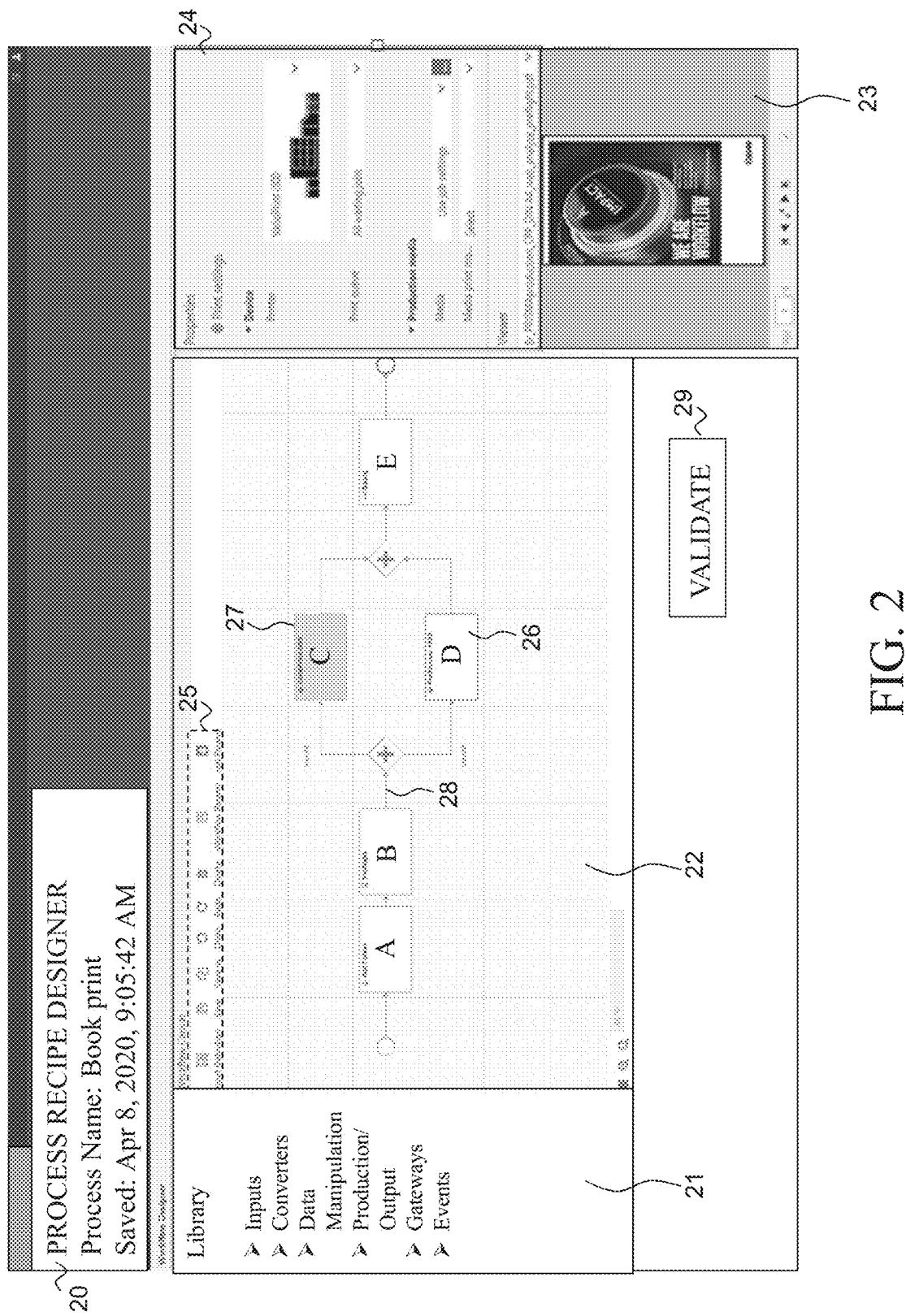
FIG. 2 show a workflow validation application for validating a process recipe according to the present disclosure.

FIG. 2 shows an example of a process recipe 22 designed by a process recipe designer application 20. The workflow designer has a library 21 of functions which can be used to construct the process recipe 22. A number of action icons 25 are available to design a workflow of the process recipe 22. The process recipe 22 in the example in FIG. 2 comprises process steps A, B, C, D, E which are characterized by a corresponding process device or by a corresponding process application. In this way the process recipe is represented by a directed graph made up of a set of vertices 27, 28 named "A", "B", "+", "C", "D", "+", "E" connected with edges 28, each edge having an associated direction, wherein the vertices represent the process steps A, B, C, D, E and the direction of an edge between two vertices represents a sequence order of execution of the corresponding process steps.

According to an embodiment the directed graph is a weighted directed graph (not shown), wherein the weight on a vertex of the weighted directed graph represents an estimated execution time of the process step represented by the vertex, the estimated execution time being determined by the digital process controller 10, 12.

The workflow name of the process recipe 22 shown in FIG. 2 is "Book print". Starting in a hot folder A and via a preflight application B, book content is split into a book block for a printing step C and a book cover for a printing step D by means of a first vertex named "+". The process recipe 22 is an example of a recipe which comprises parallel branches C, D. Each branch C, D represents a process step of a product part of the book. After the printer C and the printer D have produced the product parts book block and book cover, a second vertex named "+" merges the product parts produced by printers C and D for assembly of the book block and the book cover according to a finishing process step E by means of finisher.

The workflow designer application 20 also shows a properties area 24 of a selected process step 27 named "C". For example for the printer C print settings are displayed. The print settings may comprise selectable device settings like a device identification by means of a device name or a device image, and a selectable print queue name. The print settings may comprise production media settings like a kind of media and a media print mode.

The workflow designer application 20 shows a validate button 29 which may be pressed or touched or mouse-clicked to start a validation of the process recipe 22. Errors in a step are indicated, for example by a coloured contour of process step D. If the contour is coloured red, an error has occurred.

When the process block 26 of process D is selected more detailed information about the error is given in a pop up window or in a text box near the validate button area (not shown).

The workflow designer application 20 also shows a preview area 23 for previewing a part of the book. For example, starting on a front page of the book, the user may leaf through the pages of the book to be produced.

Using one or more simulation files, a preview of the outcome of the selected step is provided in the preview area 23. The one or more simulation files are digital files which are pre-stored in the digital process controller. The one or more simulation files represent print content for a complex composed end product. For each process recipe there may be one or more dedicated simulation files. For example, a first simulation file for book content and a second simulation file for a book cover may be provided for a process recipe labelled "book print".

Figure 3:
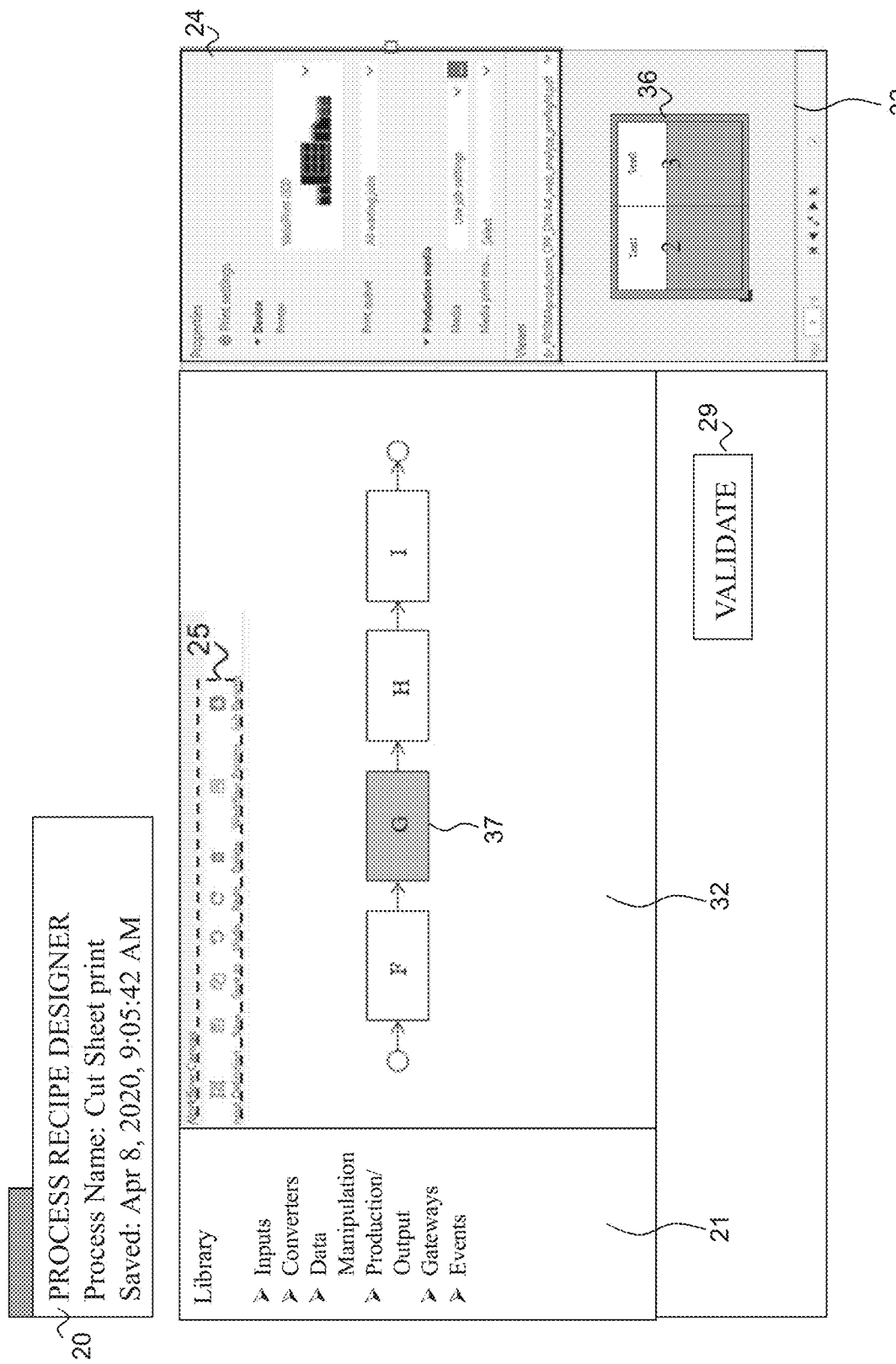
FIG. 3 shows a workflow validation application for validating a process recipe according to the present disclosure.

FIG. 3 shows another example of a process recipe 32 designed by a process recipe designer application 20. The process recipe 32 comprises a cut sheet print product with process steps F, G, H, I which are characterized by a corresponding process application (F, G, H) or a corresponding process device (I).

The workflow name of the process recipe 32 shown in FIG. 3 is "Cut Sheet print". Starting in a hot folder F and via an imposition step application G, the content of the document to be printed is arranged on the pages according to the selected imposition scheme, which is in this case a 2-up imposition scheme. Then the process recipe 32 arrives at the enhancement step H which determines the trim margins of the sheets on which the pages of the document are printed. Then the process recipe 432 arrives at the actual printing step I which is executed by a printer shown in the properties area 24 delivering a stack of printed sheets. The process recipe 23 is an example of a recipe which comprises consecutive steps F, G, H and I which comprise at least two pre-processing steps F, G, H.

The workflow designer application 20 shows a validate button 29 which may be pressed or touched or mouse-clicked to start a validation of the process recipe 32. A process step F, G, H, I may be selected to be validated. In FIG. 3 the process step G is selected which is indicated by the grey coloured process block corresponding to process G.

The workflow designer application 20 also shows again the preview area 33 for previewing an outcome of process steps up to and including the selected process step G. For example, the imposition result, a 2-up sheet view 36 of the pages numbered 2 and 3 is shown in the preview area 32. In this way intermediate results, even an intermediate result in the pre-processing stage, i.e. a stage before the actual printing by the printing device shown in properties area 24, are shown in the preview area 33.

Figure 4:
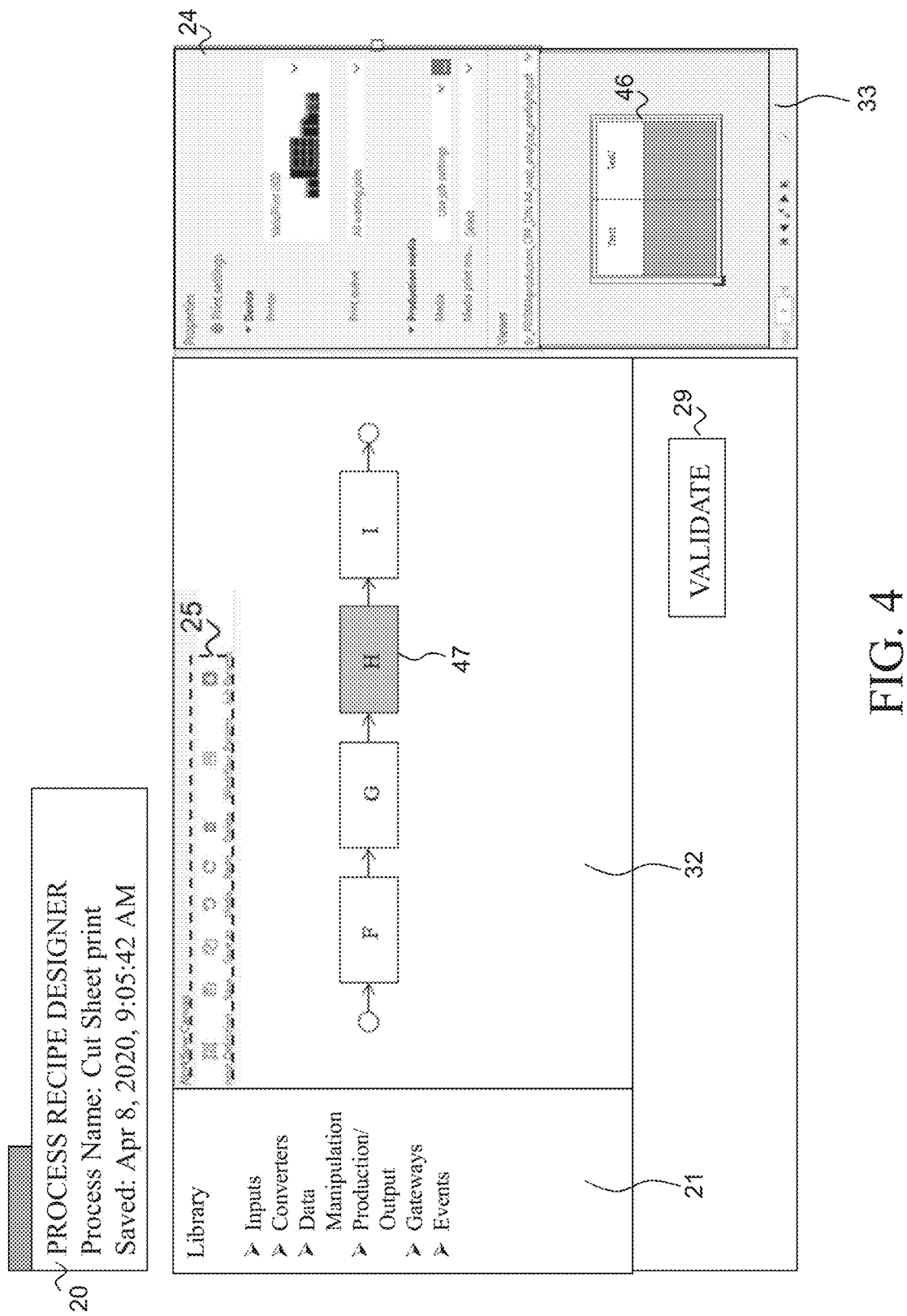
FIG. 4 shows a workflow validation application for validating a process recipe according to the present disclosure.

FIG. 4 shows a next process step H of the process recipe 32. The process step H is selected and the preview area 33 now shows the result of the process steps F, G, and H, i.e. the result of the process steps up to and including the selected process step H.

Process step H is an enhancement step, which for example determines trim margins to be taken into account since the stack of printed sheets which result from process step I may be cut by a post-processing device after printing.

Therefore the result image 46 shown in the preview area 33 in FIG. 4 differs from the result image 36 in the preview area 33 in FIG. 3. The trim margins are indicated in the result image 46 by a coloured rectangular box circumventing the 2-up page sheet. The colour of the circumventing rectangular box is red which indicates that an error has occurred in process step H.

The examples of the selected process steps G and H elucidated in FIG. 3-4 show how contents of the preview area 33 change depending on the selection of a process step of the process recipe 32.

The ability to preview intermediate results without actual execution prevents loss of time and material, and it provides better support in pinpointing where in the process recipe the problem occurs. By allocating both the errors and the preview to individual steps in a process recipe the user can do a step-by-step validation of a process recipe, going from start to finish.

The process recipe selection is not automatic, because for the same complex composed end product multiple and different process recipes may exist. By means of the process recipe design application 20 multiple ways of reaching the same complex composed end product may be defined and stored. Therefore the user is flexible to select each one of the stored process recipes.

Figure 5:
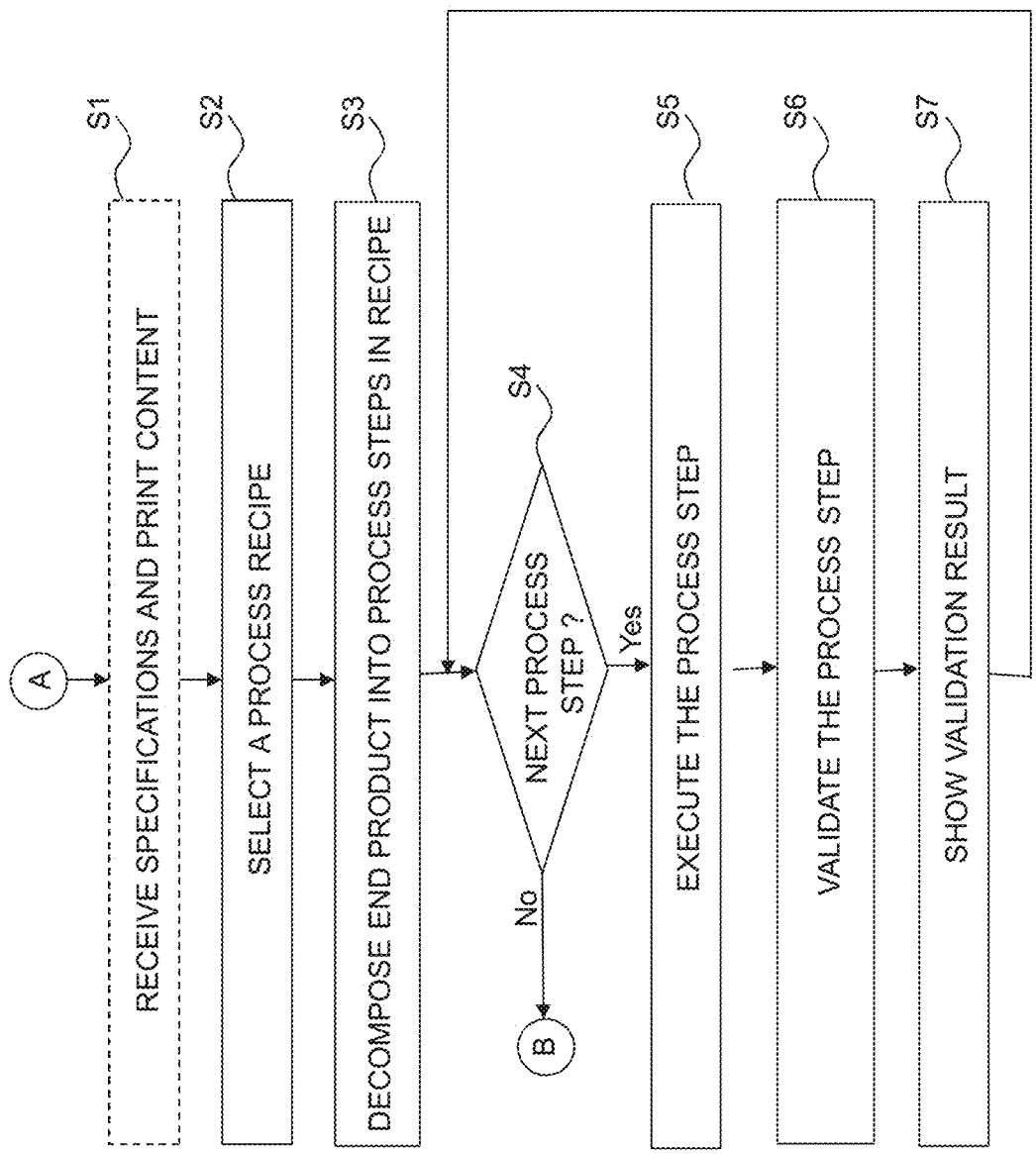
FIG. 5 is a flow diagram of the method according to the present disclosure.

FIG. 5 shows a flow diagram of the method according to the present disclosure. The method is suitable for controlling the production process of the complex composed end product by means of the digital process controller connected to the digital network.

The method starts in a starting point A which leads to a first step S1. In the first step S1 the digital process controller is receiving print content and print and finishing specifications of the complex composed end product via the digital network.

The first step S1 may be skipped as indicated by the dashed rectangle S1 in FIG. 5. It is not necessary to receive print content for a real job before execution of the validation of the process recipe. When the process recipe is to be validated and there is no receipt of print content of the real job, the validation process of the process recipe is executed by using a default document or sample file.

In a second step S2 the digital process controller is receiving a selection of a process recipe for the complex composed end product. The process recipe comprises a plurality of process steps and the relationships between the process steps.

In a third step S3 the digital process controller is decomposing the production of the complex composed end product into the plurality of process steps in the process recipe.

The decomposition of the production of the complex composed end product may be derived from properties of the complex composed end product and the resources, i.e. pre-processing applications and printing and finishing devices, which are needed to achieve the complex composed end product. The properties may be obtained from the client user who may supplies a specification list of the complex composed end product in digital or analogue form.

In a fourth step S4 it is checked if each process step is validated. If not, the message proceeds to a fifth step S5. If all process steps have been validated, the method terminates in an end point B.

The validation process is started by activating the validate button 29 shown in FIGS. 2-4.

According to an alternative embodiment at least one of the process steps A-E in FIG. 2, or F-I in FIG. 3-4 is selected to be validated before the start of the validation. This is advantageous when some of the process steps have already been validated in previously executed validations. In this way also a process step may be selected for validation which has the greatest probability on errors.

In a fifth step S5 the digital process controller is executing the process step of the process recipe.

In a sixth step S6 the digital process controller is validating the process step of the process recipe. The purpose of the validation of the process step is to check whether the process step is executed without errors. The user may investigate the preview result in the preview area 33. When the preview result is not conform to his expectations, he may look in further detail to the process step, i.e. a definition of the process step or a set of parameter values for the process step according to the selected complex composed end product.

In a seventh step S7 the validation result of the process step is displayed at the user interface of the digital process controller. The validation result is a preview of an outcome of the process step and an indication of an occurred error at or in the process step, if any. The validation result is displayed in the preview area 33 shown in FIG. 3-4 for each process step consecutively in time. When a next process step is executed the preview area 33 is updated with the new result image 36, 46 and reported errors. The reported errors may be incorporated into the result images by adding image objects having a deviating colour, for example red coloured rectangles or text boxes comprising error messages.

According to an embodiment the validation may be paused in order to give the user the opportunity to carefully inspect the result image of a currently executed process step.

On the other hand, the user may select beforehand a single process step to be validated which suits the user to dedicatedly inspect only the result image and reported errors of the selected single process step.

The method ends in an end point B.

The digital process controller according to the present disclosure may also have a remote user interface in a cloud environment. According to an embodiment the digital process controller is located in the cloud environment. According to another embodiment the multi-device time scheduler is located in the cloud environment.

The invention claimed is:

1. A digital process controller for controlling a production process of a complex composed end product by process jobs, each process job being a pre-print job, a print job or a finishing job, the digital process controller comprising a central processor and a storage medium, being connected to a digital network, comprising a workflow designer application, provided with a user interface and configured:

to receive a selection of a process recipe for the complex composed end product, the process recipe comprising a plurality of process steps and the relationships between the process steps, to validate each process step comprised in the selected process recipe individually by the workflow designer application, and to display a validation result of each process step at the user interface, wherein the process jobs comprise at least one print job and at least one finishing job, wherein the at least one finishing job is performed by means of at least one finishing device which receives the at least one print job after printing the at least one print job, and wherein the complex composed end product comprises a cut sheet print product or a book print product, and wherein at least one process step comprises in the selected process recipe is a finishing step which is executed by the at least one finishing device and validated by the workflow designer application.

2. The digital process controller according to claim 1, wherein the digital process controller is configured to receive print content and print and finishing specifications of the complex composed end product via the digital network, to decompose the production of the complex composed end product into the plurality of process steps in the process recipe, and to execute the process recipe process step by process step.

3. The digital process controller according to claim 1, wherein the validation result is a preview of an outcome of the corresponding process step and an indication of an occurred error, if any.

4. The digital process controller according to claim 1, wherein input for the execution of the process recipe is the print content.

5. The digital process controller according to claim 1, wherein input for the execution of the process recipe is a sample file which is considered to be representative for the complex composed end product.

6. The digital process controller according to claim 5, wherein a page size of the sample file matches with the page size specified in the print and finishing specifications of the complex composed end product.

7. The digital process controller according to claim 3, wherein the user interface is configured to display a real-time view on the process recipe when executed by indicating which process step of the process recipe is currently validated and by displaying the outcome of the process step and the indication of an occurred error, if any.

8. The digital process controller according to claim 7, wherein the validation comprises a check if an output format, an output data type and/or an output range of a process step in the process recipe matches with an input format, an input data type and/or an input range respectively of a next process step in the process recipe and in case of a mismatch the user interface is configured to display the process step in a deviating shape or colour.

9. The digital process controller according to claim 1, wherein the user interface is configured to display a digital representation of the process steps of the process recipe and a real-time view on the process recipe when executed by indicating which process step of the process recipe is validated and by displaying the outcome of the process step and the indication of an occurred error, if any.

10. A production system for producing complex composed products by means of printing devices and finishing devices, wherein the production system comprises a digital process controller for controlling a production process of a complex composed end product by process jobs, each process job being a pre-print job, a print job or a finishing job, the digital process controller comprising a central processor and a storage medium and being connected to a digital network, comprising a workflow designer application, and provided with a user interface and configured to:
receive a selection of a process recipe for the complex composed end product, the process recipe comprising a plurality of process steps and the relationships between the process steps;
validate each process step comprised in the selected process recipe individually by the workflow designer application; and
display a validation result of each process step at the user interface,
wherein the user interface is configured to display a digital representation of the process steps of the process recipe and a real-time view on the process recipe when executed by indicating which process step of the process recipe is validated and by displaying an outcome of the process step and an indication of an occurred error, if any, and wherein the process jobs comprise at least one print job and at least one finishing job, wherein the at least one finishing job is performed by means of at least one finishing device which receives the at least one print job after printing the at least one print job, and
wherein the complex composed print product comprises a cut sheet print product or a book print product, and wherein at least one process step comprised in the selected process recipe is a finishing step which is executed by the at least one finishing device and the workflow designer application is configured to validate the finishing step.

11. A method for controlling a production process of a complex composed end product by means of a digital process controller by process jobs, the digital process controller comprising a central processor and a storage medium and connected to a digital network, the method comprising the steps of:
receiving print content and print and finishing specifications of the complex composed end product via the digital network;
receiving a selection of a process recipe for the complex composed end product, the process recipe comprising a plurality of process steps and the relationships between the process steps;
decomposing the production of the complex composed end product into the plurality of process steps in the process recipe;
executing the process recipe process step by process step;
validating each process step individually; and
displaying a validation result per process step at the user interface,
wherein the process jobs comprise at least one print job and at least one finishing job, wherein the at least one finishing job is performed by means of at least one finishing device which receives the at least one print job after printing the at least one print job, and
wherein the complex composed end product comprises a cut sheet print product or a book print product, and wherein at least one process step comprised in the selected process recipe is a finishing step which is executed by the at least one finishing device and validated by the workflow designer application.

12. A recording medium comprising computer executable program code configured to instruct a computer to perform the method according to claim 11.

* * * * *